United States Patent [19]
Ogletree

[11] Patent Number: 5,784,306
[45] Date of Patent: Jul. 21, 1998

[54] PARALLEL MULTIPLY ACCUMULATE ARRAY CIRCUIT

[75] Inventor: Thomas M. Ogletree, Austin, Tex.

[73] Assignee: Cirrus Logic, Inc., Fremont, Calif.

[21] Appl. No.: 672,613

[22] Filed: Jun. 28, 1996

[51] Int. Cl.[6] .................................. G06F 7/48; G06F 7/52
[52] U.S. Cl. .................................. 364/750.5; 364/736.02
[58] Field of Search ........................... 364/750.5, 736.02,
364/736.05, 748.07, 748.14

[56] References Cited

U.S. PATENT DOCUMENTS

| | | | |
|---|---|---|---|
| 5,175,702 | 12/1992 | Beraud et al. | 364/736.02 |
| 5,522,085 | 5/1996 | Harrison et al. | 364/736.02 |
| 5,602,766 | 2/1997 | Bauer et al. | 364/750.5 |
| 5,650,953 | 7/1997 | Baier et al. | 364/750.5 |

*Primary Examiner*—David H. Malzahn
*Attorney, Agent, or Firm*—Wagner, Murabito & Hao; Steven A. Shaw

[57] ABSTRACT

A circuit performs controlled multiplication, shifting, and accumulation operations. A sequence of pairs of input operand signals and corresponding arithmetic control signals are synchronously supplied to the circuit by an external controller. Arithmetic control values include a downshift value (DV) for controlling shifting operations and an accumulate number (AN) for controlling accumulation operations. The circuit includes n booth multipliers (BMs) for receiving the sequenced information and a first multiplexer having n inputs each coupled to a BM output. Each BM has a BM memory control unit. For rounding purposes during downshifting, each P register of each BM is primed before each multiply operation. An internal control circuit monitors the status of each BM. If all of the BMs are "busy" and another multiply request arrives, then a stall signal is sent to the external controller. When the status of $BM_i$ is "finished," the internal control circuit selects the output of $BM_i$ to output through the first MUX. A downshift circuit is controlled to shift the output of the first MUX according to the corresponding DV. A plurality of m accumulators each have an input coupled to receive a downshift circuit output. The AN signal is used to select which of the plurality of m accumulators to enable via an accumulate select bus. Each of the m accumulators may be implemented with an adder and a register. The external controller can select one of the m accumulators to receive the final product value.

18 Claims, 7 Drawing Sheets

5,784,306

1

PARALLEL MULTIPLY ACCUMULATE ARRAY CIRCUIT

FIELD OF THE INVENTION

The present invention pertains to arithmetic logic circuits. More specifically, the present invention pertains to a mechanism for performing controlled multiplication, shifting, and accumulation operations.

BACKGROUND OF THE INVENTION

A typical central processing unit (CPU) devotes a considerable amount of processing time to implementing arithmetic operations, particularly multiplication operations. Multiplication operations require substantially more hardware resources and processing time than addition and subtraction operations. Many computer designs utilize special purpose arithmetic circuits that are integrated with the CPU and are used by the CPU to execute arithmetic instructions. Other microprocessor designs utilize external multiplier circuits to reduce the amount of processing time required to perform multiplication instructions. For a pair of input operands having 32 bits each, a microprocessor typically requires 32 clock cycles to arrive at the product. A booth multiplier circuit can reduce this period to 16 clock cycles to realize one product based on two 32 bit input operands.

Graphics processing and other processing applications often require iterative execution of arithmetic operations in the form of relationship (1), below.

$$A_1B_1+A_2B_2+A_3B_3+A_4B_4+A_5B_6+A_mB_m=X1 \quad (1)$$

Relationship (1) is a sum of products wherein the operands, Am and Bm, are z bit numbers. In order to execute an arithmetic operation in the form of relationship (1), iterative multiplication operations are required. A microprocessor requires z clock cycles to multiply two z bit numbers. Therefore, the above relationship typically requires (m×z) clock cycles for a microprocessor to solve. An auxiliary booth multiplier requires (z/2) clock cycles to multiply two z-bit numbers. However, this arrangement still requires at least m*(z/2) clock cycles to solve the relationship. Performing iterative multiplication operations at these rates can require an excessive amount of time and allocation of resources. To execute an arithmetic operation in the form of relationship (1), each of the product values, $A_1B_1$, $A_2B_2$, etc., must be accumulated, thus requiring additional processing time and resources. Therefore, a method and apparatus is needed for fast execution of arithmetic operations in the form of a sum of products to speed up computation and also to relieve the CPU of this function. The present invention provides such a mechanism.

SUMMARY OF THE INVENTION

A parallel multiply accumulate array (PMAA) circuit which performs controlled multiplication, shifting, and accumulation operations is described. A pair of input operand signals and a corresponding arithmetic control signal are synchronously supplied to the PMAA circuit by sources controlled by an external controller. The arithmetic control signal controls arithmetic operations which are performed on the corresponding pair of input operand signals by the PMAA circuit. For each pair of discrete input operand values supplied to the PMAA circuit, a set of discrete arithmetic control values is also supplied to the PMAA circuit. Different pairs of input operand values and arithmetic control values are supplied during different clock cycles, in a

2 pipelined fashion, to a plurality of multipliers. The PMAA circuit includes a multiplication stage, a shifting stage, and an accumulation stage. Each set of arithmetic control values includes a downshift value (DV) for controlling a post multiplication shifting operation and an accumulate number (AN) for controlling a post-shifting accumulation operation.

The multiplication stage of the PMAA circuit includes a plurality of n booth multipliers (BMs) and a first multiplexer (first MUX) having n inputs each coupled to receive an output product signal from one of the plurality of n BMs. Each of the plurality of n BMs has associated with it a booth multiplier memory control (BMMC) unit. For each pair of discrete input operand values supplied to one of the plurality of n BMs, $BM_i$, a corresponding set of arithmetic control values is supplied to the BMMC unit associated with $BM_i$. Arithmetic control values, DV and AN, are stored in the BMMC unit corresponding to $BM_i$ while the corresponding input operand values are multiplied in $BM_i$. The arithmetic control signals are released from the BMMC unit corresponding to BMi when the product is computed. Each BM has an A register, a B register, and a P register. In the present invention, each P register is primed before each multiply operation. In one embodiment of the present invention, each P register is primed with $2^{11}$ before each multiply operation. This initial priming of the P register of each BM accomplishes a rounding operation during the post multiplication downshifting operation.

An internal control circuit is coupled to each of the BMMC units to monitor the status (e.g., busy, finished, or empty) of each of the plurality of n BMs. If all of the BMs are "busy" and another multiply request arrives, then a stall signal is sent from the internal control circuit to the external controller. When the status of one of the BMs, $BM_i$, is "empty," a pair of discrete input operand values ($A_x$, $B_x$) are supplied to $BM_i$ and corresponding arithmetic control values are supplied to the BMMC unit associated with $BM_i$. When the status of $BM_j$ is "finished," the internal control circuit selects the output of $BM_j$ to supply through the first MUX by controlling a first MUX select bus to select the $i^{th}$ input of the first MUX. The internal control circuit then reads the arithmetic control values for $BM_j$, from the BMMC unit associated with $BM_j$, and controls post multiplication arithmetic operations performed on the output product of $BM_j$ accordingly.

The post multiplication shifting stage of the PMAA circuit includes a downshift circuit which is coupled to receive the output of the first MUX which is an output product value from one of the plurality of n BMs. The downshift circuit shifts and rotates the BM output product data according to the corresponding DV provided to the downshift circuit by the internal control circuit. An optional delay stage can be used to store the output of the downshift circuit for one clock cycle.

The accumulate stage of the PMAA circuit includes m accumulators each having an input coupled to receive the output signal from the shift circuit or from an optional delay stage. The internal control circuit uses the accumulate number, AN, to select which of the plurality of m accumulators to enable via an accumulate select bus. Each of the m accumulators may be implemented with an adder and a register. Each of the m accumulators has an output coupled to provide an accumulated value to one of m inputs to a second MUX. The external control circuit selects the output of one of the plurality of m accumulators, $ACC_j$, to output through the second MUX by controlling a second MUX select bus to select the jth input of the second MUX.

BRIEF DESCRIPTION OF THE DRAWINGS

The present invention is illustrated by way of example, and not by way of limitation, in the figures of the accom-

Figure 1:
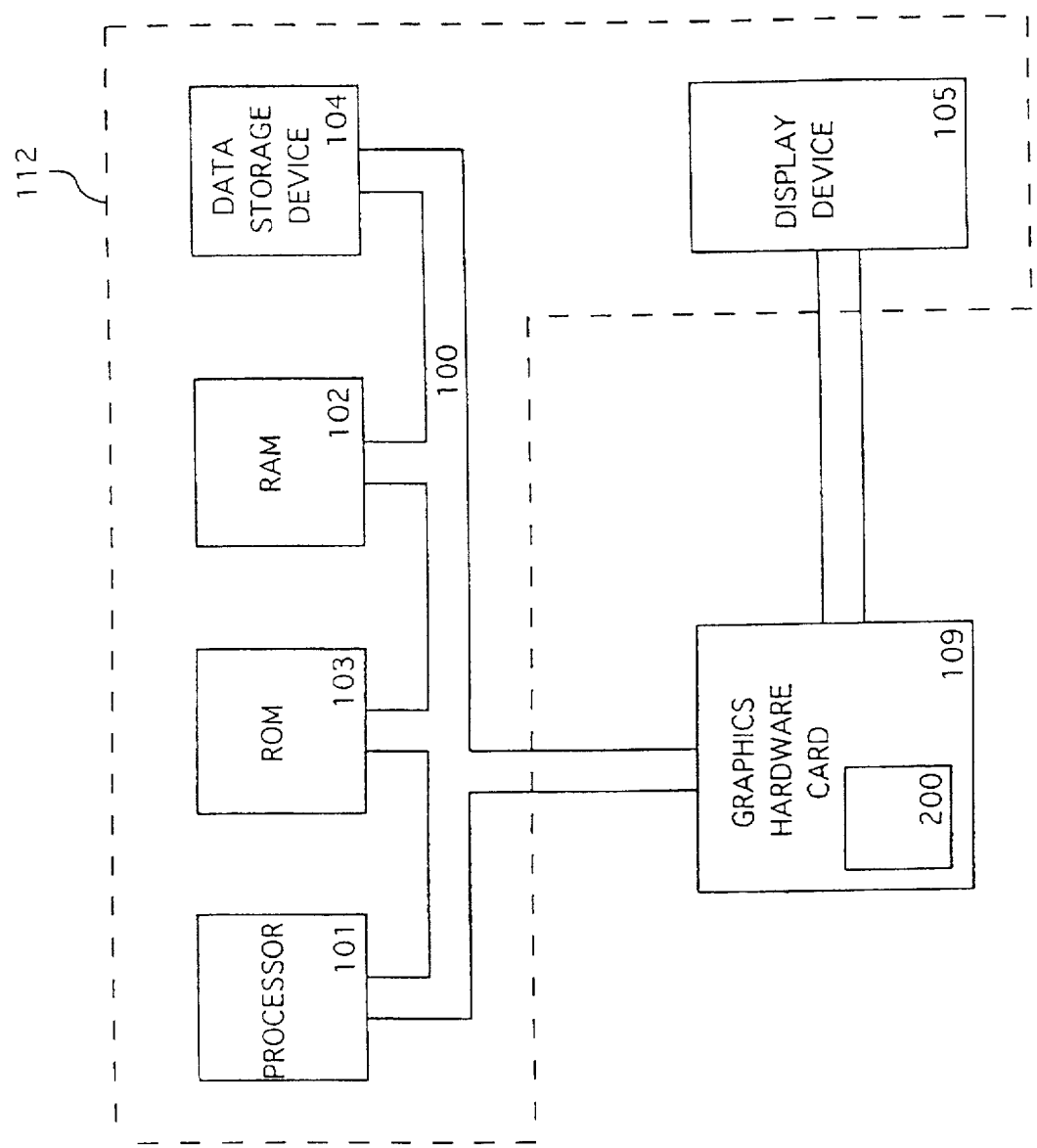

3 panying drawings and in which like reference numerals refer to similar elements and in which:

FIG. 1 is a block diagram of an exemplary host system employing the parallel multiply accumulate array (PMAA) circuit according to the present invention.

Figure 2:
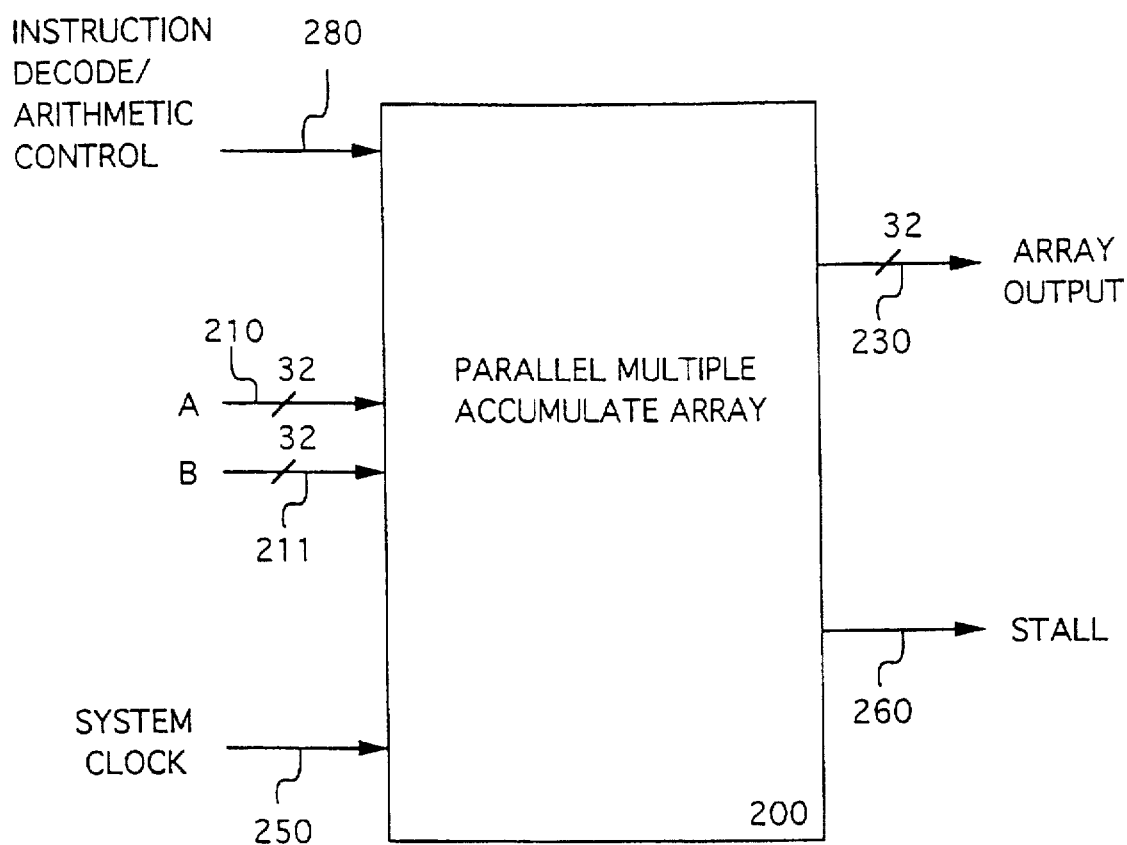

FIG. 2 is an input/output block diagram of an exemplary PMAA circuit according to the present invention.

Figure 3A:
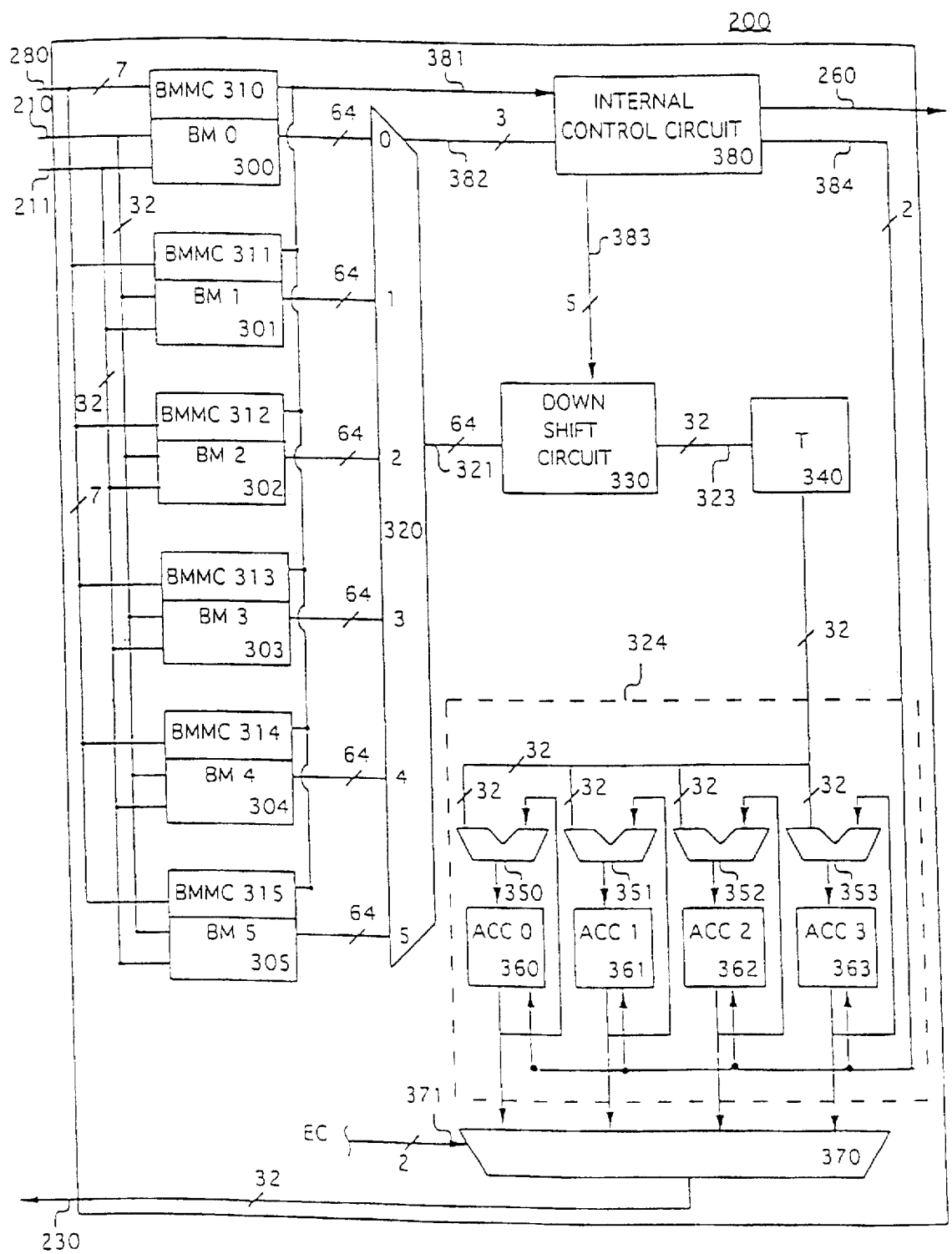

FIG. 3A is an internal circuit block diagram of an exemplary PMAA circuit according to the present invention.

Figure 3B:
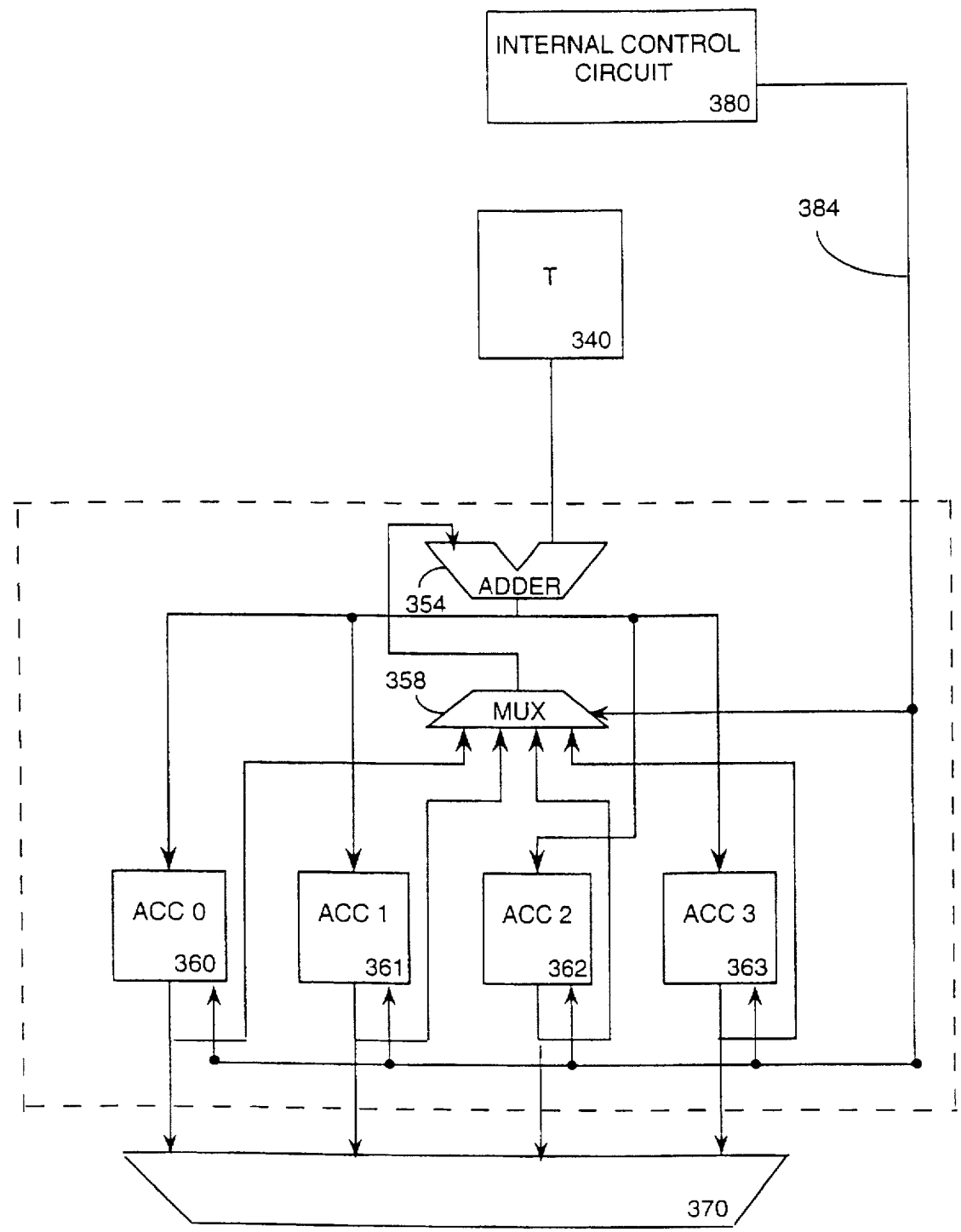

FIG. 3B is a circuit block diagram of an alternative embodiment of an accumulation stage of the PMAA circuit of the present invention.

Figure 4:
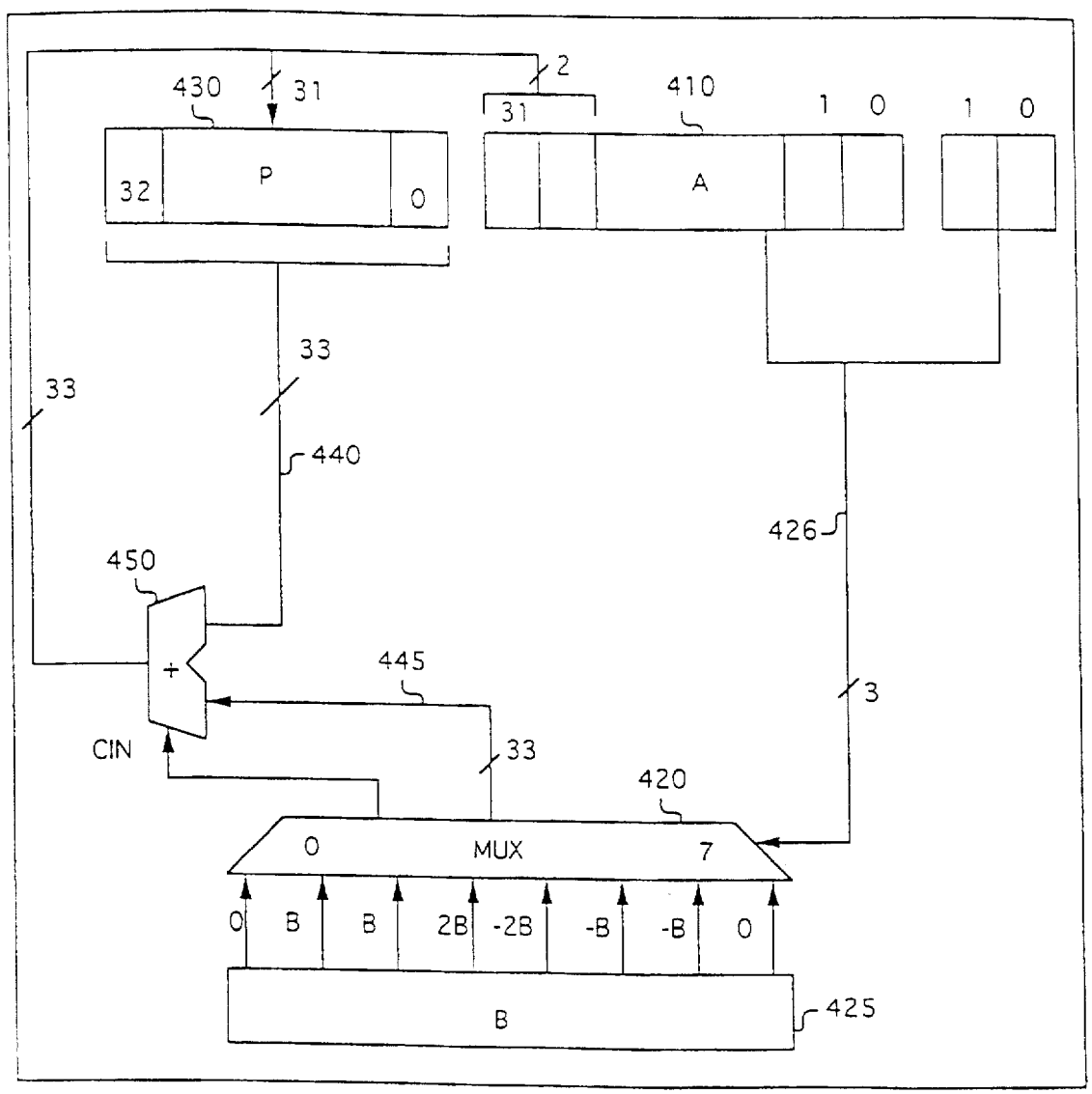

FIG. 4 is an internal circuit block diagram of a booth multiplier circuit implemented in accordance with the present invention.

Figure 5:
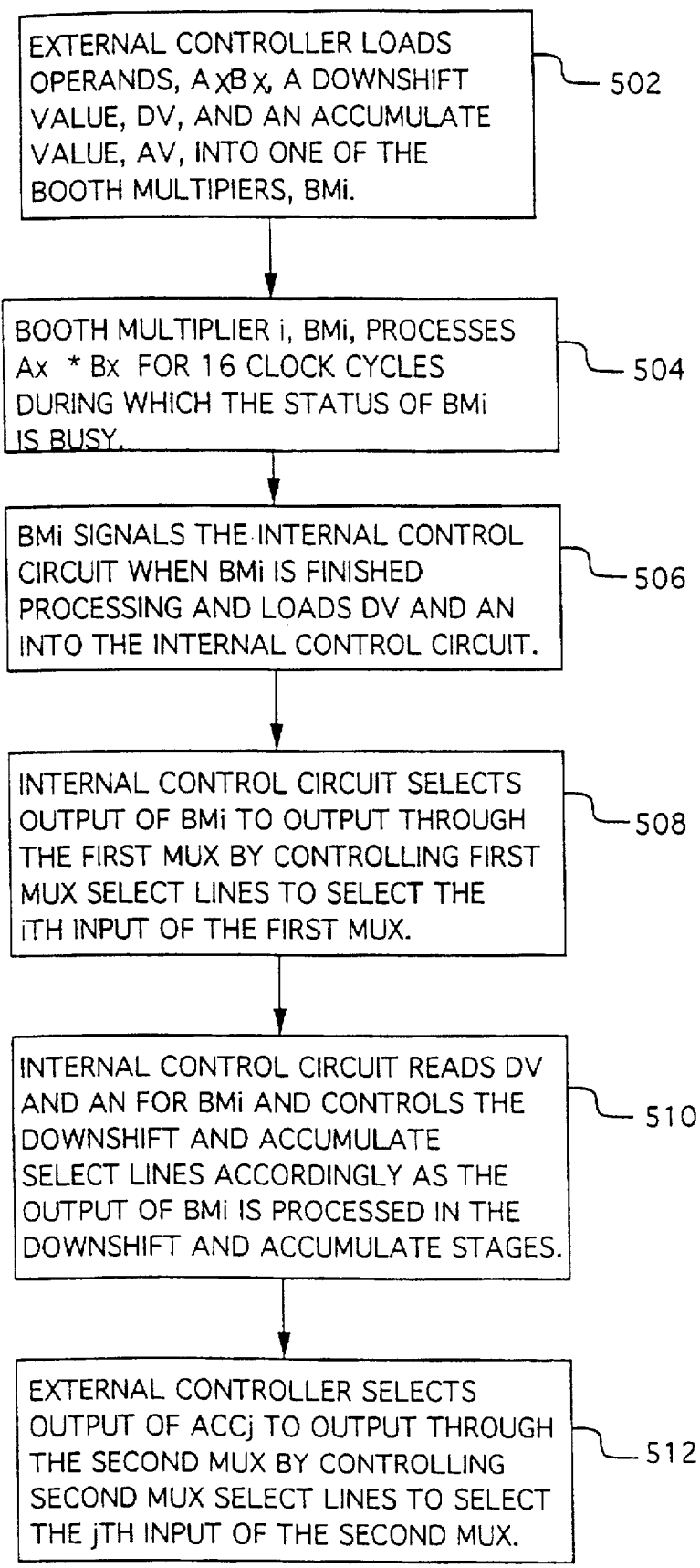

FIG. 5 is a flow diagram of steps according to a method of the present invention for performing controlled multiplication and accumulation operations.

Figure 6:
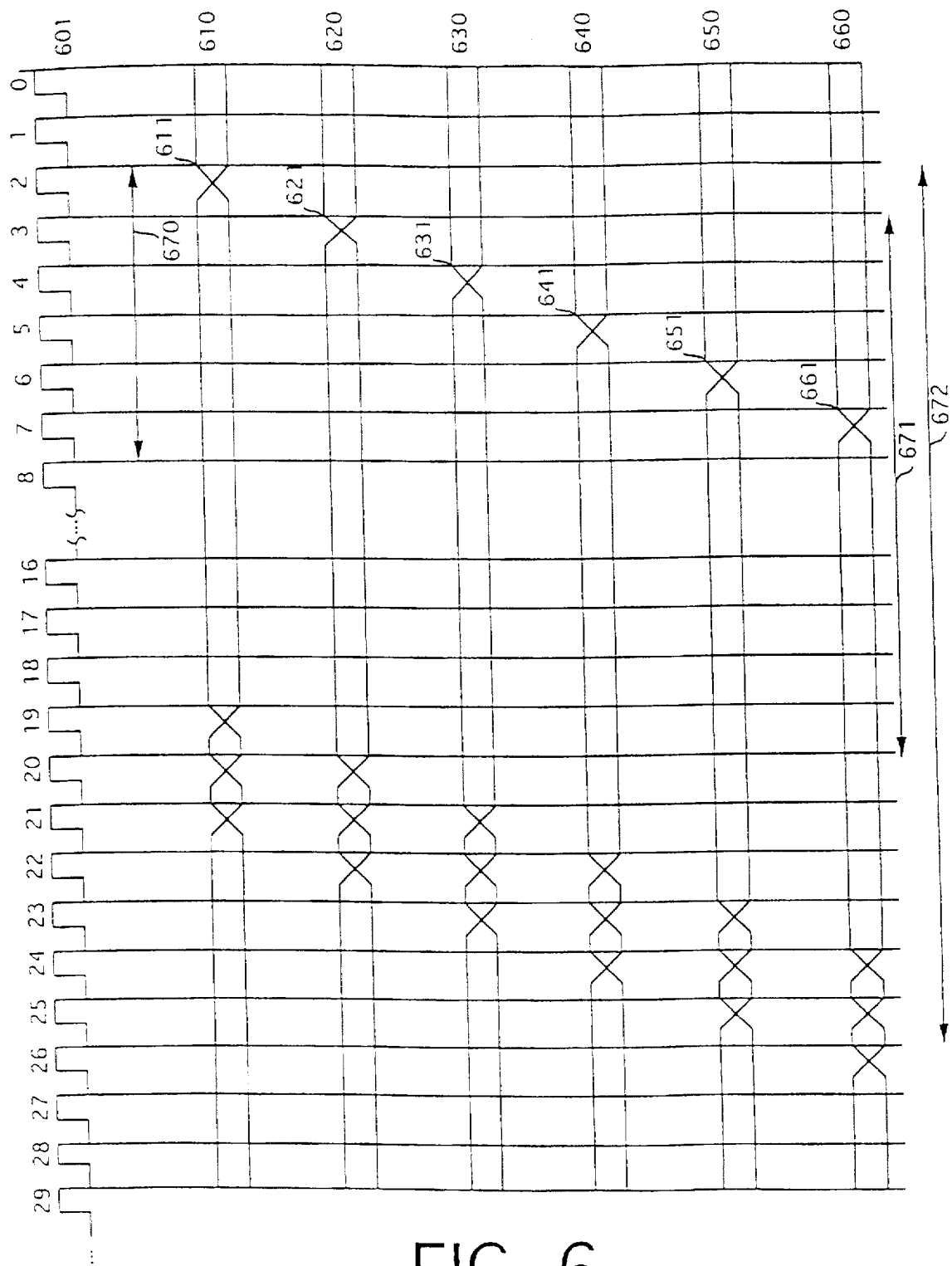

FIG. 6 is a timing diagram for an exemplary PMAA circuit according to the present invention.

DESCRIPTION OF THE PREFERRED EMBODIMENTS

A parallel multiply accumulate array circuit is described in the following detailed description of the present invention in which numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

FIG. 1 illustrates an exemplary host computer system 112 utilizing a parallel multiply accumulate array (PMAA) circuit 200 according to the present invention. The exemplary host computer system 112 comprises a bus 100 for communicating information, a central processor 101 coupled with the bus 100 for processing information and instructions, a random access memory 102 coupled with the bus 100 for storing information and instructions for the central processor 101, a read only memory 103 coupled with the bus 100 for storing static information and instructions for the processor 101, and a data storage device 104 such as a magnetic or optical disk and disk drive coupled with the bus 100 for storing information and instructions. The processor 101 can contain an arithmetic logic unit (ALU) for performing arithmetic and logic operations and a control unit which provides timing and control signals. The host system 112 provides data and control signals via bus 100 to a graphics hardware card 109. The graphics hardware card 109 ("graphics accelerator card") contains a graphics processor which executes a series of display commands. The graphics hardware card 109 may contain a processor including an ALU and a control unit. The graphics hardware card 109 supplies data and control signals to a display device 105 (which can be part of the host system 112) for rendering images on display device 105.

In a preferred embodiment of the present invention, a PMAA circuit 200 is integrated within the graphics hardware card 109. The PMAA circuit 200 performs multiplication-accumulation processes to reduce the processing load on the processor within graphics hardware device 109 or the host processor 101. The PMAA circuit 200 is controlled by a controller external to the circuit 200. The

4

"external controller," as it shall be referred to herein, can include a CPU 101 or other controller in the exemplary host processor 101 or in the exemplary graphics hardware card 109 (e.g., an ALU device), or elsewhere. The display device 105 coupled to the graphics hardware card 109 is for displaying information to the computer user. The display device 105 can be a liquid crystal device, cathode ray tube, or other display device suitable for creating graphic images and alphanumeric characters recognizable to the user.

FIG. 2 is an input/output block diagram of an exemplary PMAA circuit 200 according to the present invention for performing controlled arithmetic operations including multiplication, shifting, and accumulation operations. Referring to FIG. 2, an instruction decode signal is supplied to the PMAA circuit 200 from the external controller via an arithmetic control/instruction decode signal bus 280. The instruction decode signal synchronizes operations of the PMAA circuit 200. If the PMAA circuit 200 is busy (temporarily unable to perform arithmetic operations) then a stall signal is sent to the external controller via a stall output line 260. A system clock signal is supplied to the PMAA circuit 200 from the host system 112 via a system clock input line 250.

The input and output of data signals to and from the exemplary PMAA circuit 200 is also controlled by the external controller. The exemplary PMAA circuit 200 includes first and second input operand buses 210, 211 which receive respectively first ("A") and second ("B") input operand signals from a memory or other storage source controlled by the external controller. The exemplary PMAA circuit 200 also includes an array output signal bus 230. In the preferred embodiment of the present invention, the input operand signals and array output signals are in a fixed point format (FPF) which has a fixed number of integer bits to the left of the binary point and a fixed number of fractional bits to the right of the binary point. A convention for expressing fixed point binary numbers is (x, y) where x refers to the number of integer bits and y refers to the number of fractional bits of the binary number. In a preferred embodiment of the present invention, each operand input bus 210, 211 receives a 32 bit operand input operand signal in (20.12) FPF from an external source which is controlled by the external controller. The exemplary PMAA circuit 200 provides a 32 bit array output signal in (20.12) FPF. The dimensions of the fixed point formats of the array output signal bus 230 and input operand buses 210, 211 can be varied in the instant invention.

Arithmetic control signals are also provided by the external controller to the exemplary PMAA circuit 200, via the arithmetic control/instruction decode signal bus 280, in synchronization with the first and second input operand signals. The arithmetic control signals include an adjust control signal (DV) which controls a post multiplication shifting operation and an accumulation control signal (AN) which selects from a plurality of accumulators to control a post shifting accumulation operation. For each pair of first and second input operand signals, circuit 200 receives a corresponding DV and AN signal.

In the preferred embodiment of the present invention, the exemplary PMAA circuit 200 is used in a RISC core graphics triangle set up engine to execute arithmetic operations necessitated specifically by texture set up techniques. The graphics texture set up processing techniques involve repetitive performance of a multiply-accumulate operation (e.g., inverse discrete cosin transform function) which requires executing arithmetic operations in the form of relationships (1) through (3), below:

$$A_1B_1+A_2B_2+A_3B_3+A_4B_4+A_5B_5+A_mB_m=X1 \quad (1)$$

$$C_1D_1+C_2D_2+C_3D_3+C_4D_4+C_5D_5+C_mD_m=X2 \quad (2)$$

$$G_1H_1+G_2H_2+G_3H_3+G_1H_1+G_1H_1+G_mH_m=Xn \quad (3)$$

where the summed products (e.g., $A_1B_1$, $A_2B_2$, etc.) are determined by the multiplication stages of circuit 200 and the accumulated result (e.g., X1, X2, etc.) is maintained by the accumulator stages of circuit 200.

FIG. 3A shows an internal circuit block diagram of an exemplary PMAA circuit 200 according to the present invention. The exemplary PMAA circuit 200 is used to execute multiplication and accumulation operations in the form of relationships (1) through (3) above where in one embodiment the input operands A, B, C, etc., are 32 bit (20.12) FPF numbers in two's compliment form. The exemplary PMAA circuit 200 includes a parallel multiplication stage, a post multiplication shifting stage, and a controlled accumulation stage.

Parallel Multiplication Stage

The parallel multiplication stage of the present invention includes a plurality of n booth multipliers; $BM_1$, $BM_2$, ... $BM_n$. Referring to FIG. 3A, the exemplary PMAA circuit 200 of one embodiment includes n=6 booth multipliers (BMs); $BM_0$ 300, $BM_1$ 301, $BM_2$ 202, $BM_3$ 203, $BM_4$ 304, and $BM_5$ 305. However, n can be any number. In an alternative embodiment of the present invention, n=3. A first input ("A") of each of the six BMs 300–305 is connected to the first input operand bus 210. A second input ("B") of each BM is connected to the second input operand bus 211. Each of the six BMs 300–305 has an output coupled to provide a BM output product signal to one of n inputs to a first multiplexer 320. Each of the plurality of n BMs of the present invention has associated with it a booth multiplier memory control (BMMC) unit. The exemplary PMAA circuit 200 includes BMMC units 310–315 integrated respectively within associated BMs 300–305. Alternatively, the BMMC units 310–315 can also be separate from the corresponding BMs.

The external controller provides arithmetic control signals to an input to each BMMC unit 310–315 via the arithmetic control/instruction decode signal bus 280. For each pair of discrete input operands provided to one of the six BMs 300–305, $BM_i$, the external controller provides a corresponding set of arithmetic control values to the BMMC unit associated with BMi. Each set of arithmetic control values includes a downshift value, DV, for controlling a post multiplication shift operation and an accumulate number, AN, for selecting from the plurality of accumulators to control the accumulation operation.

Each BMMC unit 310–315 has an output coupled to an internal control circuit 380 via a BMMC control bus 381. The internal control circuit 380 receives discrete arithmetic control values from the BMMC units 310–315 via the BMMC control bus 381. The internal control circuit 380 also receives a BM status control signal from each of the BMMC units 310–315 via the BMMC control bus 381. The BM status control signal contains the status of each of the plurality of n BMs. Each of the six BMs 300–305 has associated with it a status which indicates whether the BM is busy, finished, or empty. While one of the plurality of n BMs 300–305, $BM_i$, is multiplying a pair of operand signals, the status of $BM_i$ is "busy." After $BM_i$ has arrived at a product value for a pair of input operands, but before the BM output product value has been output, the status of $BM_i$ is "finished." After the product value has been output, but before new operands are loaded into $BM_i$, the status of the $BM_i$ is "empty." Because the exemplary PMAA circuit 200 of FIG. 3A has six BMs 300–305 with three possible status's for each, (2×6) or 12 bits are required for the BM status control signal. In the preferred embodiment of the present invention, DV is a 5 bit value and AN is a two bit value. However, the present invention is well suited for use with different values. Therefore, in the preferred embodiment of the present invention, the BMMC control bus 381 includes 19 bits.

A first MUX select bus 382 is coupled between the first MUX 320 and the internal control circuit 380. The internal control circuit 380 uses the first MUX select bus 382 to select the $i^{th}$ input of the first MUX 320 which corresponds to $BM_i$. In one embodiment where six BMs 300–305 are used, bus 382 is three bits wide.

In an alternative embodiment of the present invention, a method and apparatus is provided for speeding up multiplication operations performed by the BMs 300–305. Logic circuitry is provided to eliminate leading insignificant bits from the first and second inputs, A and B, which are provided by the first and second input operand buses 210, 211. Generally, booth multipliers compute from the lower bits to the upper bits of the input operands. If the upper bits are insignificant (all zeros for positive numbers or all ones for negative numbers), then within this alternative embodiment computation is not performed for the upper bits since the result is predetermined. The result of the partial multiplication is then downshifted by the BMs 300–305 appropriately by additional bits to compensate for the elimination of the leading insignificant bits. The benefit of this alternative embodiment is to speed up the multiplication of the BMs 300–305.

Post Multiplication Shifting Stage

The post multiplication shifting stage of the PMAA circuit 200 includes a downshift circuit 330 which is coupled to receive the output of the first MUX 320 over bus 322 which is a BM output product value. In the preferred embodiment of the present invention, both input operand signals over buses 210 and 211 are 32 bit (20.12) FPF numbers. Therefore, the BM output product values which are supplied from the BMs 300–305 through the first MUX 320 to the downshift circuit 330 are 64 bit (40.24) FPF numbers. The downshift circuit 330 shifts the $BM_i$ output product data according to the corresponding downshift value (DV) which is provided to the downshift circuit 330 by the internal control circuit 380 via an adjust control bus 383. In the preferred embodiment, the downshift circuit 330 is controlled by a 5 bit adjust control signal (DV) which causes the downshift circuit 330 to right left by DV bits to rotate out the lower 12 bits of the $BM_i$ output product signal provided to the downshift circuit 330. The shift range is 0 to 31. After the shifting, the lower 30 bits are latched in a delay register 340. The upper bits are discarded.

In the preferred embodiment of the present invention, the downshift circuit 330 is a barrel shifter which is controlled by a 5 bit adjust signal supplied over bus 383. The downshift circuit 330 transforms a 64 bit (40.24) fixed format BM output product signal over bus 322 into a 32 bit (20.12) fixed format signal over bus 323. The function of the downshift circuit 330 in the preferred embodiment of the present invention is to rotate out the lower 12 bits of the BM output product signal provided to the downshift circuit 330.

Accumulation Stage

The accumulation stage 324 of the PMAA circuit 200 of the present invention includes a plurality of m accumulators, ACC0 360, ACC1 361, ... ACCm 363, each having an input coupled to receive an output signal from the downshift stage. An accumulate select bus 384 is used to select which of the plurality of m accumulators to enable to receive the output of the downshift stage. Each accumulator can be implemented with an adder (e.g., 350) and a register (e.g., 360) as shown.

Referring to FIG. 3A, the exemplary PMAA circuit 200 includes m=4 accumulators comprising four adders 350–353 and four accumulator registers 360–363. However, m can be smaller or larger. In an alternative embodiment of the present invention, m=3. Each of the four adders 350–353 has a first input coupled to receive a 32 bit output signal from the delay register 340. The four accumulator registers 360–363 each have an input coupled to receive an output signal from one of the four adders 350–353. An output of each accumulator register 360–363 is coupled, via a feedback line, to a second input of the adder 350–353 to which the input of the accumulator register is coupled. Specifically, the output of the first accumulator register 360 is coupled to a second input of the first adder 350, the output of the second register 361 is coupled to a second input of the second adder 351, the output of the third register 362 is coupled to a second input of the third adder 352, and the output of the fourth register 363 is coupled to a second input of the fourth adder 353.

In the preferred embodiment of the present invention, an accumulate select bus 384 is coupled between the internal control circuit 380 and each of the four accumulator registers 360–363 to select (e.g., enable) which of the four accumulator registers 360–363 to enable at any given time. In the preferred embodiment of the present invention, a two bit accumulate select bus 384 is required to control the four accumulator registers 360–363 with the two bit accumulate number (AN).

The PMAA circuit 200 also includes a second MUX 370 having m=4 inputs each coupled to receive an output signal from one of the four accumulator registers 360–363. The external controller selects the output of one of the four accumulator registers 360–363, $ACC_j$, to output through the second MUX 370 by controlling a second MUX select bus 371 to select the jth input of the second MUX 370 to be supplied over output bus 230.

Referring to FIG. 3B, an alternative embodiment is shown of the accumulation stage 324 of the PMAA circuit 200 of the present invention. The alternative embodiment accumulation stage 325 includes the plurality of m accumulators, ACC0 360, ACC1 361, ... ACCm 363. In this embodiment, a single adder 354 is used in conjunction with an accumulator select multiplexer 358 to add the outputs of the downshift stage to an accumulated value stored in one of the m accumulators 360–363. Since only one addition commmand is processed per clock cycle, this embodiment uses only one adder instead of m adders thus reducing circuit complexity and area. The adder 354 has a first input coupled to receive a 32 bit output signal from the delay register 340. The adder 354 has a second input coupled to receive a 32 bit output signal from the accumulator select multiplexer 358. Each of the four accumulator registers 360–363 has an input coupled to receive an output signal from the adder 358. Each of the m accumulator registers 360–363 has an output coupled to provide a summed value to one of m inputs to the accumulator select multiplexer 358. The accumulate select bus 384 can be used to control the four accumulator registers 360–363 with the two bit accumulate number (AN). The accumulate select bus 384 can also be used to select which of the plurality of m inputs to the accumulator select multiplexer 358 to enable. The second MUX 370 can be used with the alternative embodiment accumulation stage 325 as it is used with the preferred embodiment accumulation stage 324; to receive an output signal from one of the four accumulator registers 360–363.

FIG. 4 is an internal circuit block diagram of a booth multiplier circuit 400 used in the present invention. Apart from the preload function, described to follow, the booth multiplier circuit used in accordance with the present invention can be of a number of well known designs including radix-4, radix-8, or radix-16. In the preferred embodiment of the present invention, radix-16 booth multipliers are used for BMs 300–305 (FIG. 3A). Booth multipliers allow n bit multiplication to be done using fewer than n additions or subtractions, thereby making possible faster multiplication. Each of the BM circuits 300–305 (See FIG. 3A) can be realized according to exemplary booth multiplier circuit 400. The exemplary booth multiplier circuit 400 includes an A register 410, a B register 425, and a P register 430. In the preferred embodiment of the instant invention, the P register 430 of each BM 300–305 is initially primed with $2^{11}$ before the 32 bit input data operands are loaded into the BM 300–305. (See FIG. 3A). This initial priming provides for a rounding function when downshift circuit 330 shifts its contents down by 12 bits. After a pair of 32 bit discrete input operands are loaded into BM 400 (A into register 410 and B into register 425) and the P register 430 is primed, the multiplication begins. During each clock, the registers 410, 430 are shifted right two bits at a time. The bottom (LSB) bits of register 410 and one extension bit are used for select bus 426 which controls a MUX 420. Adder 450 adds the 32 bit output value over bus 445 with the 32 bit value over bus 440. The most significant 31 bits of the result is placed into register 430 and the least significant 2 bits are placed in the MSB bits of register 410.

FIG. 5 is a flow chart of the operational steps of circuit 200 according to the present invention for performing controlled parallel multiplication and accumulation operations using the PMAA circuit 200. Step 502 of the method of the present invention requires that the external controller load input operands, $A_xB_x$, a downshift value, DV, and an accumulate value, AV, into an empty booth multiplier, $BM_i$, of BMs 300–305. In step 504, $BM_i$ processes Ax*Bx for 16 clock cycles during which the status of $BM_i$ is busy. In step 506, $BM_i$ signals the internal control circuit 380 when $BM_i$ is finished processing and when requested to do so loads DV and AV into the internal control circuit 380 via BMMC control bus 381 (See FIG. 3A). In step 508, the internal control circuit 380 selects the output of $BM_i$ to output through the first MUX 320 by controlling the first MUX select bus 382 to select the $i^{th}$ input of the first MUX 320. In step 510, the internal control circuit 380 reads DV and AN for $BM_i$ and controls the adjust control bus 383 and the accumulate select bus 384 accordingly as the output of $BM_i$ is processed in the shifting and accumulation stages of the PMAA circuit 200. In the final step, 512, the external controller selects an output of a particular accumulator to output through the second MUX 370 by controlling the second MUX select bus 371 to select the required input of the second MUX 370.

FIG. 6 illustrates timing relationships for the processing of six sequentially loaded discrete input operand pairs in the exemplary PMAA circuit 200 according to the present invention. Signal 601 is the host system clock signal provided to the PMAA circuit 200 at the system clock input line 250 (See FIG. 2). Timing diagram 610 represents the number of clock cycles required to process a first pair of discrete input operands, which are loaded into the first BM 300, in the PMAA circuit 200 (See FIG. 3A). Time point 611 represents the time at which a first pair of input operands is loaded into the first BM 300 and a corresponding first set of arithmetic control values is loaded into the BMMC unit 310 associated with BM 300 (See FIG. 3A). Time point 612 represents the time at which the first BM 300 finishes multiplying the first pair of input operands (See FIG. 3A). At this point in time, the status of BM 300 is "finished" and the internal control circuit 380 reads the arithmetic control values ($AN_1$ and $DV_1$), corresponding to the first pair of input operands, from the BMMC unit 310 and a product is provided over 64 bit bus 322 (See FIG. 3A). The internal control circuit 380 then supplies $DV_1$ to the downshift circuit 330 via the adjust control bus 383 and also supplies $AN_1$ to the adders 350–353 via the accumulate select bus 384 (See FIG. 3A). Time point 613 represents the time at which the downshift circuit 330 produces a shifted product output value over 32 bit bus 323. Time point 614 represents the time at which the external controller can read an accumulated value from one of the accumulator registers 360–363 over the array output bus 230 (See FIG. 3A).

Timing diagram 620 represents the number of clock cycles required to process a second pair of discrete input operands, which are loaded into the BM 301, in the PMAA circuit 200 (See FIG. 3A). Time point 621 represents the time at which the second pair of input operands is loaded into the second BM 301 and a corresponding second set of arithmetic control values is loaded into the BMMC unit 311 which is associated with the second BM 301 (See FIG. 3A). Time point 622 represents the time at which the second BM 301 finishes multiplying the second pair of input operands (See FIG. 3A). At this point in time, the status of BM 301 is "finished" and the internal control circuit 380 reads the arithmetic control values $AN_2$ and $DV_2$, corresponding to the second pair of input operands, from the BMMC unit 311 and a product is provided over 64 bit bus 322 (See FIG. 3A). The internal control circuit 380 then supplies $DV_2$ to the downshift circuit 330 via the adjust control bus 383 and also supplies $AN_2$ to the adders 350–353 via the accumulate select bus 384 (See FIG. 3A). Time point 623 represents the time at which the downshift circuit 330 produces a shifted output value over the 32 bit bus 323 (See FIG. 3A). Time point 624 represents the time at which the external controller can read an accumulated value from one of the accumulator registers 360–363 over bus 230.

Timing diagrams 630, 640, 650, and 660 represent the number of clock cycles required to process, in the PMAA circuit 200, a third, fourth, fifth, and sixth pair of input operands, which are loaded into the BMs 302, 303, 304, and 305 respectively. Timing relationships 630, 640, 650, and 660 are identical to timing relationships 610 and 620 except that the input operand pairs are loaded into different BMs and their timing is staggered. As shown in FIG. 6, the exemplary PMAA circuit 200 allows the BMs 300–305 to operate in a pipelined fashion whereby their functions are overlapped in time. This feature gives the present invention a great speed advantage in allowing up to n products to be partially completed in parallel.

Referring to FIG. 6, the time interval 670 represents the number of clock cycles, six, required to sequentially load six different discrete input operand pairs into the six parallel BMs 300–305 of the exemplary PMAA circuit 200 (See FIG. 3A). The time interval 671 represents the number of clock cycles, sixteen, required to multiply a single pair of 32 bit input operands in one of the BMs 300–305. An additional clock cycle is required to load the BM. The time interval 672 represents the number of clock cycles, 24, required to multiply, shift, accumulate, and output six pairs of input operands in the exemplary PMAA circuit 200 of the instant invention. This period corresponds to the time required by the present invention to solve relationship (1), reprinted below:

$$A_1B_1+A_2B_2+A_3B_3+A_4B_4+A_5B_6+A_mB_m=X1 \quad (1)$$

The preferred embodiment of the present invention, a parallel multiply accumulate array, is thus described. While the present invention has been described in particular embodiments, it should be appreciated that the present invention should not be construed as limited by such embodiments, but rather construed according to the below claims.

What is claimed is:

1. A parallel multiply accumulate array circuit, comprising:

a plurality of n multipliers each coupled to receive a first x-bit operand and a second x-bit operand and generating a 2x-bit product;

a first multiplexer having n inputs coupled to receive n 2x-bit products from said plurality of n multipliers and providing one 2x-bit product output;

a downshift circuit coupled to receive said one 2x-bit product output, said downshift circuit for downshifting y bits of said one 2x-bit product output;

a plurality of m accumulators each having an input coupled to receive a downshifted output from said downshift circuit, each of said accumulators for accumulating a separate summed value; and a second multiplexer including m inputs each coupled to receive summed values from one of said plurality of m accumulators and also having an output for supplying one of said summed values.

2. The circuit of claim 1 further comprising an internal control circuit for controlling:

a select bus of said first multiplexer;

a downshift adjust bus of said downshift circuit; and an enable bus of said plurality of m accumulators.

3. The circuit of claim 1 wherein each of said accumulators comprise an adder and a register.

4. The circuit of claim 1 wherein a delay register is coupled between said downshift circuit and said plurality of m accumulators.

5. The circuit of claim 1 wherein each of said plurality of n multipliers is a booth multiplier.

6. The circuit of claim 5 wherein a P register of each booth multiplier is primed with a value (11 bits) so that said downshift circuit rounds.

7. The circuit of claim 1 wherein n=6, m=4, x=32, and y=12.

8. The circuit of claim 1 wherein n=3, m=3, x=32, and y is programmable for each clock cycle of said circuit of claim 1.

9. The circuit of claim 1 wherein each of said plurality of n multipliers contains memory for storing data for downshift values and accumulate enable information associated with said first x-bit value and said second x-bit value.

10. Within a graphics card of a host computer system, a parallel multiply accumulate array circuit, comprising:

a plurality of n multipliers each coupled to receive a first x-bit operand and a second x-bit operand and generating a 2x-bit product;

a first multiplexer having n inputs coupled to receive n 2x-bit products from said plurality of n multipliers and providing one 2x-bit output;

a downshift circuit coupled to receive said one 2-x bit output of said first multiplexer, said downshift circuit for downshifting y bits of said one 2x bit output; a plurality of m accumulators each having an input coupled to receive a downshifted output from said downshift circuit, each of said accumulators for accumulating a separate summed value; and a second multiplexer including m inputs each coupled to receive summed values from one of said plurality of m accumulators and also having an output for supplying one of said summed values.

11. The circuit of claim 10 further comprising an internal control circuit for controlling:

select buss of said first multiplexer;

a downshift adjust bus of said downshift circuit; and enable buss of said plurality of m accumulators.

12. The circuit of claim 10 wherein each of said accumulators comprise an adder and a register.

13. The circuit of claim 10 wherein a delay register is coupled between said downshift circuit and said plurality of m accumulators.

14. The circuit of claim 10 wherein each of said plurality of n multipliers is a booth multiplier.

15. The circuit of claim 10 wherein a P register of each booth multiplier is primed with a value of y bits so that said downshift circuit rounds, wherein y is programmable for each clock cycle of said circuit of claim 10.

16. The circuit of claim 10 wherein n=6, m=4, x=32, and y=12.

17. The circuit of claim 10 wherein n=3, m=3, x=32, and y is programmable for each clock cycle of said circuit of claim 10.

18. The circuit of claim 10 wherein each of said plurality of n multipliers contains memory for storing data for downshift values and accumulate enable information.

* * * * *